United States Patent [19]
Nakatani et al.

[11] Patent Number: 5,587,194
[45] Date of Patent: Dec. 24, 1996

[54] APPARATUS AND METHOD FOR STERILIZING FOOD

[75] Inventors: Masayuki Nakatani, Nagoya; Koji Sengoku, Chiba-ken; Akifumi Fujita, Ichihara, all of Japan

[73] Assignee: House Foods Corporation, Osaka, Japan

[21] Appl. No.: 490,708

[22] Filed: Jun. 15, 1995

[30] Foreign Application Priority Data

Jun. 16, 1994 [JP] Japan ............................ 6-134655

[51] Int. Cl.$^6$ ............................................. A23L 3/00
[52] U.S. Cl. ............................ 426/521; 99/470; 99/483; 426/511; 426/524
[58] Field of Search ........................... 426/521, 511, 426/524, 407; 99/470, 361, 483

[56] References Cited

U.S. PATENT DOCUMENTS 4,196,225  4/1980  Mencacci ..................... 426/523
4,773,321  9/1988  Wijts .............................. 99/470
5,320,856  6/1994  Veronesi et al. ............... 426/521

FOREIGN PATENT DOCUMENTS

2559354   8/1985   France.
49-71177  7/1974   Japan.
51-42391  4/1976   Japan.
64-51069  2/1989   Japan.
4-370081  12/1992  Japan.

*Primary Examiner*—George Yeung
*Attorney, Agent, or Firm*—Reid & Priest L.L.P.

[57] ABSTRACT

In the apparatus and method of the present invention, the inner pressure of the cooling chamber is maintained at a level higher than the inner pressure of the heating and sterilizing chamber connected to the cooling chamber via a sealing gate by 0.05–0.3 Kg/cm$^2$, more preferably, 0.1–0.2 Kg/cm$^2$. Accordingly, when the sealing gate is opened to advance the food from the heating and sterilizing chamber to the cooling chamber, any pressure drop will not occur at the heating and sterilizing chamber side of the sealing gate, so that the re-boiling phenomenon is avoidable.

6 Claims, 5 Drawing Sheets

APPARATUS AND METHOD FOR STERILIZING FOOD

BACKGROUND OF THE INVENTION

1. Field of the Invention

The present invention relates to an apparatus and method for sterilizing food and, more particularly to the sterilization of the food in the apparatus which includes a sterilizing chamber for heating and sterilizing the food and a cooling chamber continuously connected to the sterilizing chamber.

2. Description of the Related Art

Various types of sterilizing apparatus wherein food is successively advanced into a sterilizing chamber for heating and sterilizing food at high temperature (or at high temperature and under high pressure) are known. For example, see Japanese Patent Laid-Open Publication No. 49-71177, Japanese Patent Laid-Open Publication No,. 51-42391 and Japanese Patent Laid-Open Publication No. 64-51069.

With any of these sterilizing apparatuses, conveying means for advancing the food must be arranged within the sterilizing chamber of the apparatus. However, the conveying means provided within the sealed sterilizing chamber can make the entire configuration of the apertures complex or complicated and is disadvantageous to maintaining the sterilizing chamber in aseptic condition.

In an attempt to resolve such problems explained above, different food sterilizing apparatuses have been proposed to successively advance the food in a sealed and heated sterilizing chamber without the conveying means provided within the sterilizing chamber, for example, in co-pending U.S. patent application Ser. No. 08/395,111 filed on Feb. 27, 1995, assigned to the assignee of the present application. In the suggested apparatus, food received in containers is heated and sterilized in a heater (heating and sterilizing chamber) and then, successively advanced into a cooler (cooling chamber) connected to the heater via a sealing gate and cooled. The sealing gate provided between the heater and cooler is intermittently opened, so that the containers are advanced from the heater to the cooler. In this apparatus, the inner pressure of the heater is set at a level higher than that of the cooler in order to prevent the inflow of the cooled air into the heater during opening of the sealing gate.

However, with the above arrangement, due to the higher pressure in the heater, a rapid pressure drop occurs on the heater side of the sealing gate when the sealing gate is opened. The pressure drop causes the re-boiling phenomenon, that is, the drain water in the heater bumps and wets the food. The bumping water significantly deteriorates the quality of the food.

SUMMARY OF THE INVENTION

In view of the above mentioned problems, it is therefore an object of the present invention to provide an apparatus and method for sterilizing food, that can prevent the re-boiling phenomenon when the sealing gate provided between the heater (heating chamber) and the cooler (cooling chamber), is opened.

In order to achieve the above and other objects, the present invention provides a food sterilizing apparatus including a heating and sterilizing chamber for heating and sterilizing the food and a cooling chamber connected to the heating and sterilizing chamber via a sealing gate, wherein the food received in containers having open portions is successively advanced from the heating and sterilizing chamber to the cooling chamber, and wherein the inner pressure of the cooling chamber is maintained at a level higher than the inner pressure of the heating and sterilizing chamber by 0.05–0.3 Kg/cm$^2$.

In another aspect of the present invention, a food sterilizing method is provided using a sterilizing apparatus including a heating and sterilizing chamber for heating and sterilizing the food and a cooling chamber connected to the heating and sterilizing chamber via a sealing gate, wherein inner pressure of the cooling chamber is maintained at a level higher than inner pressure of the heating and sterilizing chamber by 0.05–0.3 Kg/cm$^2$.

In still another aspect of the present invention, a food sterilizing apparatus is provided comprising a food feeding section in communication with the atmosphere, a pressure upward regulating chamber, a heating and sterilizing chamber for heating and sterilizing food under pressure higher than the atmospheric pressure, a cooling chamber for cooling the heated and sterilized food, a pressure downward regulating chamber and a delivery section for discharging food arranged successively and connected by way of respective sealing gates, the food being contained in rigid containers having an opening and moved successively from the food feeding section to the heating and sterilizing chamber. The food feeding section, the heating and sterilizing chamber, the cooling chamber and the delivery section and arranged perpendicularly relative to or in parallel with each other and the food feeding section, the pressure upward regulating chamber, the heating and sterilizing chamber, the cooling chamber, the pressure downward regulating chamber and the delivery section are provided at respective upstream portions thereof with a pusher device for pushing downstream the rigid containers, each of pusher devices having a stroke equal to or greater than the width of the rigid container. An inner pressure of the cooling chamber is maintained at a level higher than inner pressure of the heating and sterilizing chamber by 0.05–0.3 Kg/cm$^2$.

In the preferred embodiment of the invention, the inner pressure of the cooling chamber is maintained at a level higher than the inner pressure of the heating and sterilizing chamber by 0.1–0.2 Kg/cm$^2$.

With the apparatus and method according to the present invention, the re-boiling phenomenon is avoidable so that the quality of the food is maintained and the quality of the sterilized food is improved.

If the pressure difference between the cooling chamber and the heating and sterilizing chamber is smaller than 0.05 Kg/cm$^2$, the re-boiling phenomenon will occur. On the other hand, if the pressure difference is greater than 0.3 Kg/cm$^2$, the great amount of cold air will flow into the heating and sterilizing chamber from the cooling chamber to lower the heating efficiency in the heating and sterilizing chamber. Therefore, the inner pressure of the cooling chamber should be maintained at a level higher than the inner pressure of the heating and sterilizing chamber by 0.05–0.3 Kg/cm$^2$, more preferably, 0.1–0.2 Kg/cm$^2$.

Now, the present invention will be described in greater detail by referring to the accompanying drawings that illustrate preferred embodiments of the invention.

DETAILED DESCRIPTION OF THE PREFERRED EMBODIMENTS

Now, the invention will be described by referring to the accompanying drawings that illustrate preferred embodiments of the invention.

A first embodiment of the present invention is described below by referring to FIGS. 1 through 5, where the food sterilizing apparatus is generally denoted by reference numeral 100.

Figure 2:
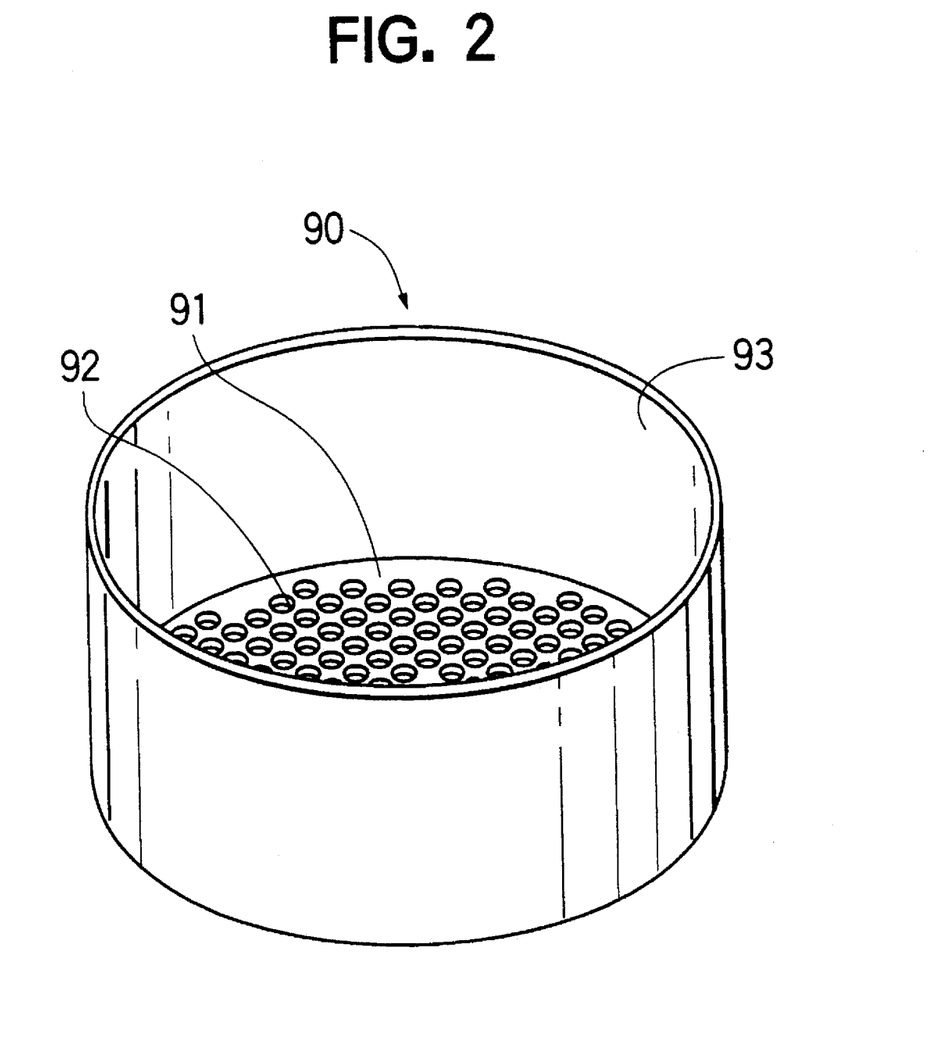
FIG. 2 is a schematic perspective view of a tray for containing food that can be used for first and second embodiments of the food sterilizing apparatus according to the invention.

The food sterilizing apparatus 100 of this embodiment is designed to heat and sterilize solid food to be packed in retort pouches at a later stage, such as boiled rice, cooked noodles, or the solid ingredients of stew or curry (e.g., vegetables), contained in rigid trays 90 or other containers. FIG. 2 schematically illustrates a tray adapted for use in the embodiment. The tray 90 is hollow and cylindrical and typically made of metal such as stainless steel. It has an open top 93 and a closed bottom and is designed to carry a predetermined volume of food (e.g., one portion of boiled rice). As a plurality of trays 90 successively passes through the food sterilizing apparatus 100, the food in the trays is heated and sterilized.

The bottom plate 91 of the tray 90 is provided with a number of small through bores 92 distributed over the entire area of the bottom plate 91. The size of the through bores 92 are so selected that the food placed on the bottom plate 92 of the tray 90 may not fall therethrough. Steam or other heating and sterilizing fluid may freely pass the bottom plate through the small through bores 92 to get to the entire surface of the food on the bottom plate 91.

Figure 1:
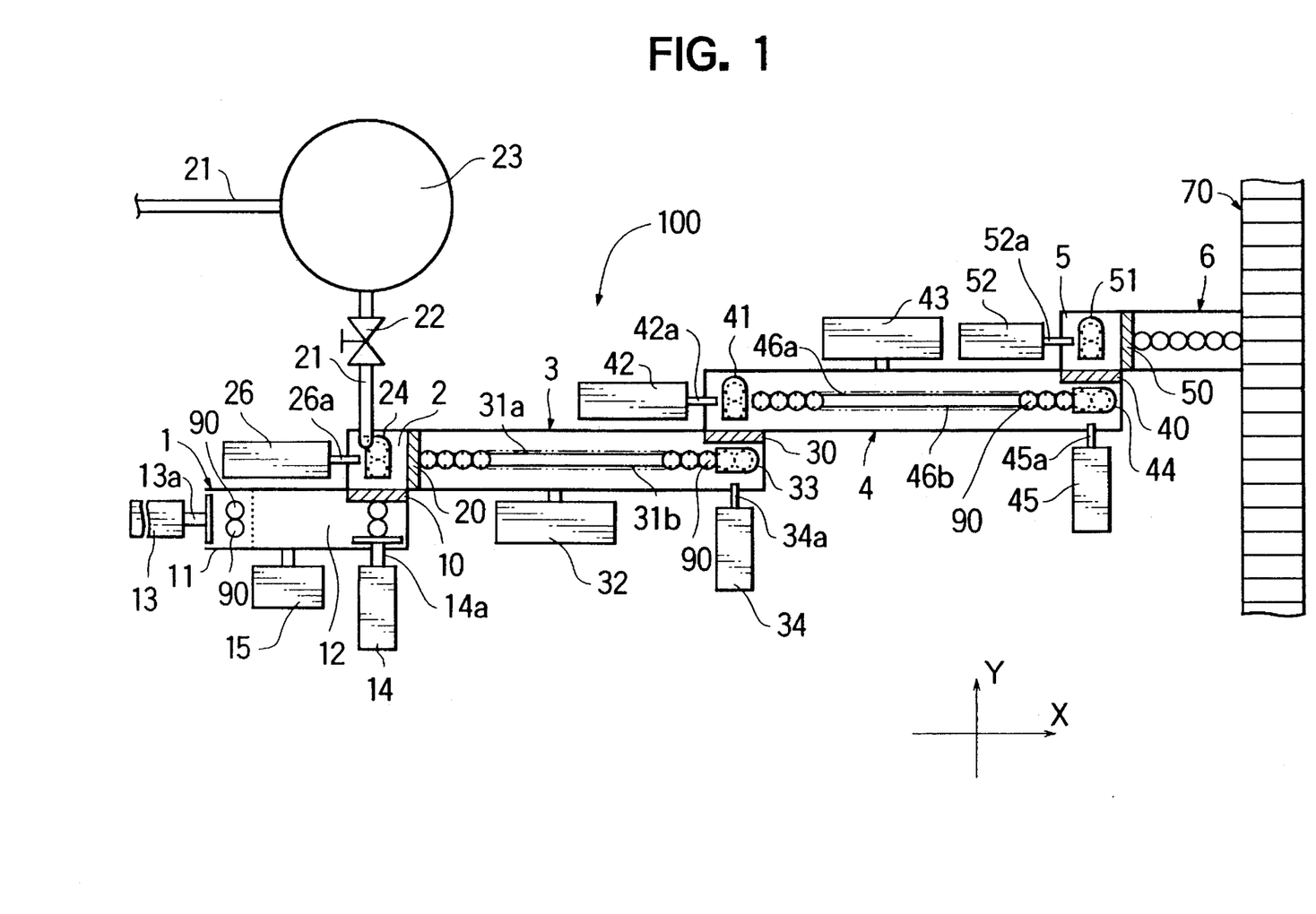
FIG. 1 is a schematic plan view of a first embodiment of food sterilizing apparatus according to the invention, showing its overall configuration.

The main body of the food sterilizing apparatus 100 has a configuration as described below. Referring to FIG. 1, the food sterilizing apparatus 100 comprises, from the upstream end thereof, a food feeding section 1 held in communication with the atmosphere and designed to receive trays 90 containing food to be sterilized, a heating and sterilizing chamber 3 for heating and sterilizing food under pressure higher than the atmospheric pressure, a cooling chamber 4 for cooling the heated and sterilized food and a delivery section 6 for discharging the cooled food out of the food sterilizing apparatus 100.

The food feeding section 1 by turn comprises a receiving section 11 located at the upstream extremity of the apparatus in order to receive the food containing trays 90 and a preheating chamber 12 located downstream of the receiving section 11 in order to preheat the food in the trays 90 under the atmospheric pressure. A pressure upward regulating chamber 2 is disposed upstream of the heating and sterilizing chamber 3 and separated therefrom by a second gate valve 20, whereas a pressure downward regulating chamber 5 is disposed upstream of the delivery section 6 and separated therefrom by a fifth gate valve 50.

The preheating chamber 12 located in a downstream area of the food feeding section 1 is connected to the pressure upward regulating chamber 2 located in an upstream area of the heating and sterilizing chamber 3 by way of a first gate valve 10. The heating and sterilizing chamber 3 is connected at a downstream portion thereof to an upstream area of the cooling chamber 4 via a third gate valve 30. The cooling chamber 4 is connected at a downstream portion thereof to the pressure downward regulating chamber 5 located upstream relative to the delivery section 6. Thus, trays 90 introduced into the food sterilizing apparatus 100 through the receiving section 11 of the food feeding section 1 are moved by pusher devices 13, 14, 26, 34, 42, 45 and 52 to the delivery section 6 by way of the preheating chamber 12, the pressure upward regulating chamber 2, the heating and sterilizing chamber 3, the cooling chamber 4 and the pressure downward regulating chamber 5.

A pair of trays 90, 90 containing food to be sterilized is placed in juxtaposition in the receiving section 11 of the food feeding section 1 by a feeding means (not shown). The receiving section 11 is provided at an upstream portion thereof with a first pusher device 13 for moving downstream (in direction X) the paired trays 90, 90. The first pusher device 13 is provided with a T-shaped extendible pusher rod 13a, which pusher rod 13a is extendible and has a stroke that enables it to push the juxtaposed trays 90, 90 downstream (in direction X) in the food feeding section 1 to the downstream end of the preheating chamber 12.

The preheating chamber 12 is provided outside the downstream end thereof with a second pusher device 14. More specifically, the second pusher device 14 is arranged opposite to the pressure upward regulating chamber 2 with the downstream end of the preheating chamber 12 disposed therebetween. Like the first pusher device 13, the second pusher device 14 is provided with a T-shaped extendible pusher rod 14a, which pusher rod 14a is extendible in a direction (in direction Y) perpendicular to the general direction of movement of trays 90, 90 toward the pressure upward regulating chamber 2. The rod 14a has a stroke that enables it to go into the downstream end of the preheating chamber 12 and push the juxtaposed trays 90, 90 that arrive at the downstream end of the preheating chamber 12 under the pushing effect of the first pusher device 13 this time in a single row along the direction Y into a turn table provided in the pressure upward regulating chamber 2.

The preheating chamber 12 is open to the atmosphere and therefore held under the atmospheric pressure and has a shape and dimensions adapted to guide a pair of juxtaposed trays 90, 90 downstream.

The preheating chamber 12 is additionally provided with a preheating means 15 which is schematically shown in FIG. 1. The preheating means 15 supply steam into the preheating chamber 12, deaerating the preheating chamber 12.

The pressure upward regulating chamber 2 is connected at an upper portion thereof with a steam supply pipe 21 for feeding steam. The steam supply pipe 21 is in turn connected to a steam supply source (not shown) by way of a control valve 22 and a steam tank 23 (pressurized fluid tank) for storing steam. As steam is generated in the steam supply source and fed to the pressure upward regulating chamber 2 by way of the steam supply pipe 21, the inner pressure and the temperature of the pressure upward regulating chamber 2 can be raised to the respective levels of the inner pressure and the temperature of the heating and sterilizing chamber 3. The steam tank 23 is designed to temporarily store steam from the steam supply source and preferably has a capacity (volume) 5 to 50 times, and more preferably 10 to 30 times, greater than the capacity of the pressure upward regulating chamber 2. The pressure of steam in the steam tank 23 is preferably between 0.5 and 3.0 kg/cm$^2$ and more preferably between 1.0 and 2.5 kg/cm$^2$ (gauge pressure). The control valve 22 is designed to control the supply of steam to the pressure upward regulating chamber 2 by its ON/OFF action realized under the control of a control device (not shown). A turn table 24 is arranged within the pressure upward regulating chamber and rotatable around a vertical axis Z (See FIGS. 3 and 4). The turn table itself is a substantially rectangularly parallelepipedic cabinet-like hollow body which is open at a longitudinal lateral side and dimensioned so as to contain a pair of trays in a row. Thus, a pair of trays 90, 90 can move into and out of the turn table 24 through the open side (open area 24b). A substantially circular hole 24a is cut through the lateral wall opposite the open side of the turn table 24. The top plate 24c of the turn table 24 covers the open tops of the trays 90, 90 housed in the turn table 24. More specifically, the top plate 24c is located between the open end 21a of the steam supply pipe 21 in the pressure upward regulating chamber 2 and the open tops 93, 93 of the trays 90, 90 housed in the turn table 24, so that it effectively prevents steam blown out of the open end 21a of the pipe 21 from directly entering the trays 90, 90 through the open tops 93, 93.

The turn table 24 is provided at the bottom thereof with a rotary shaft 25 so that it may rotate around said rotary shaft 25 by a predetermined angle. More specifically, the turn table 24 rotates by 90° between a first position (shown in FIGS. 1 and 3) where the open side area 24b faces the preheating chamber 12 and a second position (shown in FIG. 4) where the open side area 24b faces the heating and sterilizing chamber 3. In the first position of the turn table 24, a pair of trays 90, 90 can be housed in the turn table 24 as they are pushed forward toward the pressure upward regulating chamber 2 (in direction Y) by the second pusher device 14, whereas, in the second position, the pair of trays 90, 90 housed in the turn table 24 can be pushed into the heating and sterilizing chamber 3 from the turn table 24 through the open side area 24b thereof by a third pusher device 26, which will be described hereinafter.

Figure 4:
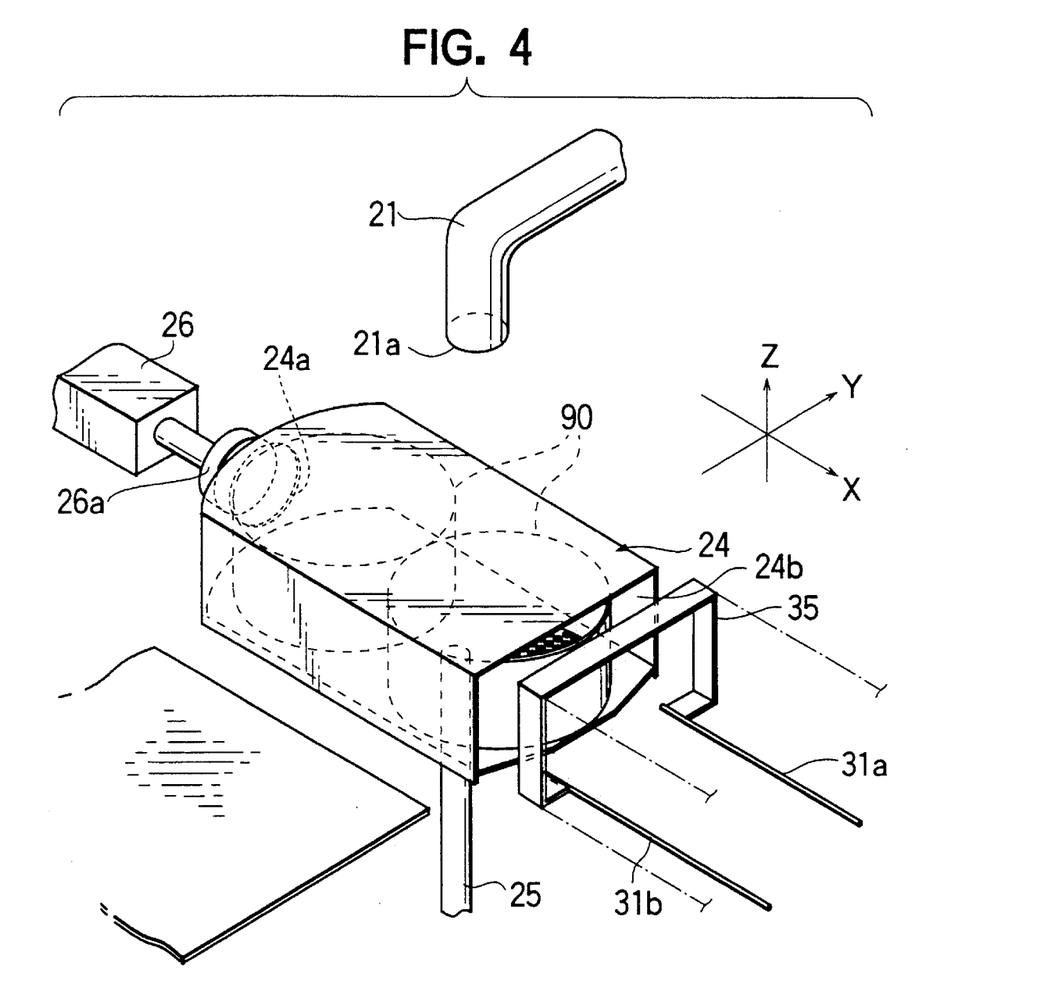
FIG. 4 is a schematic perspective view of the turn table arranged in the pressure upward regulating chamber of the first embodiment of the food sterilizing apparatus according to the invention, showing the turn table placed in a second position.

Outside the pressure upward regulating chamber 2 and at the side thereof disposed opposite the heating and sterilizing chamber 3, there is provided a third pusher device 26 for pushing out a pair of trays 90, 90 housed in the turn table 24 into the heating and sterilizing chamber 3 when the turn table 24 is disposed in its second position as shown in FIG. 4. The third pusher device 26 is provided with an extendible pusher rod 26a, which is so shaped and dimensioned that it can move through the hole 24a cut through a wall of the turn table 24. The extendible pusher rod 26a has a stroke long enough to push out a pair of trays 90, 90 housed in the turn table 24 and arranged in a row as shown in FIG. 4 into the heating and sterilizing chamber 3.

The heating and sterilizing chamber 3 is located downstream of the pressure upward regulating chamber 2 and has a substantially cylindrical and oblong inner space, where a pair of rails 31a and 31b are arranged in parallel with a given distance separating them from each other and extend longitudinally over the entire length of the chamber 3. The pair of trays 90, 90 pushed out of the pressure upward regulating chamber 2 and forced into the heating and sterilizing chamber 3 by the third pusher device 26 are then moved downstream on the rails 31a and 31b, the distance separating the rails 31a and 31b being so selected for them to appropriately support the bottoms of the moving trays 90, 90. The rails 31a and 31b are provided with a number of guide members 35 arranged with a predetermined distance separating any adjacent ones so that the trays 90, 90 can safely and smoothly move along the rails 31a and 31b. In shorts, the rails 31a and 31b and the guide members 35 constitute a tray transfer route for advancing trays into the heating and sterilizing chamber 3 in a row.

The heating and sterilizing chamber 3 is provided with a heating and sterilizing means 32 for maintaining the inner pressure and temperature of the heating and sterilizing chamber 3 at predetermined levels. The heating and sterilizing means 32, which is schematically illustrated in FIG. 1, feed steam to the heating and sterilizing chamber 3 to maintain the inner pressure and the temperature of the heating and sterilizing chamber 3 to 0.45–2.65 kg/cm$^2$, preferably to 1.00–2.15 kg/cm$^2$ (gauge pressure), and 120°–135° C. respectively.

The heating and sterilizing chamber 3 is provided at the downstream end thereof with a turn table 33 similar to the one arranged in the pressure upward regulating chamber 2. The heating and sterilizing chamber 3 is additionally provided outside and at the side thereof disposed opposite the cooling chamber 4 with a fourth pusher device 34 similar to the third pusher device 26. The turn table 33 and the pusher device 34 operate like the turn table 24 and the third pusher device 26, respectively. As described above, the heating and sterilizing chamber 3 is connected at the downstream end thereof to the upstream end of the cooling chamber 4 arranged in parallel with the heating and sterilizing chamber 3 by way of a gate valve 30.

The cooling chamber 4 is provided at the upstream end thereof with a turn table 41 similar to the one arranged in the pressure upward regulating chamber 2. The cooling chamber 4 is additionally provided near the upstream end thereof with a fifth pusher device 42 similar to the third pusher device 26. The turn table 41 and the pusher device 42 operate like the turn table 24 and the third pusher device 26 respectively.

The cooling chamber 4 has a configuration similar to that of the heating and sterilizing chamber 3. It has a substantially cylindrical and oblong inner space, where a pair of rails 46a and 46b are arranged in parallel with a given distance separating them from each other and extend longitudinally over the entire length of the chamber. The pair of trays carried in a row by the turn table 41 are advanced downstream on the rails 46a and 46b, the distance separating the rails 46a and 46b being so selected for them to appropriately support the bottoms of the moving trays 90, 90. The rails 46a and 46b are provided with a number of guide members similar to the guide members 35 described above and arranged with a predetermined distance separating any adjacent ones so that the trays 90, 90 can safely and smoothly move along the rails 46a and 46b.

The cooling chamber 4 is provided with a cooling means 43 for maintaining the inner pressure and the temperature of the cooling chamber 4 to predetermined respective levels. The cooling means 43, which is schematically illustrated in FIG. 1, for example, feed air at 80° C. to the cooling chamber 4 to maintain the inner temperature of the chamber 4 to 80° C. and the inner pressure thereof to a level higher than that of the heating and sterilizing chamber 3 by 0.05–0.3 cm/Kg², more preferably, 0.1–0.2 cm/Kg², respectively.

The cooling chamber 4 is provided at the downstream end thereof with a turn table 44 similar to the one arranged in the pressure upward regulating chamber 2. The cooling chamber 4 is additionally provided near the downstream end thereof with a sixth pusher device 45 similar to the third pusher device 26. The turn table 44 and the sixth pusher device 45 operate like the turn table 24 and the third pusher device 26, respectively.

The pressure downward regulating chamber 5 is arranged in parallel with and connected to the downstream end of the cooling chamber 4 by way of a gate valve 40 and has a configuration similar to that of the pressure upward regulating chamber 2. More specifically, it is provided with a turn table 51 for receiving a pair of trays 90, 90 arranged in a row and coming from the cooling chamber 4 and a seventh pusher device 52 for moving the trays 90, 90 housed in the turn table 51 in a row into the delivery section 6. The pressure downward regulating chamber 5 differs from the pressure upward regulating chamber 2 in that the steam supply pipe 21 of the latter is replaced with an air supply pipe (not shown).

The delivery section 6 is provided at the downstream side thereof with a conveying means 70 such as a belt conveyor. The sterilized food that has been moved to the delivery section in trays 90 is then sent to a packaging station (not shown). Note that the delivery section 6, the conveying means 70 and the packaging station are housed in a clean room. At the packaging station, the food is taken out of the trays 90 and packed in sterilized containers which are the packages for the finished product, the containers are then air-tightly sealed after, if necessary, having been filled with sterilized liquid food.

For the purpose of the invention, the term "steam" includes saturated steam and super heated steam and other vapors used for heating and sterilization.

The above described food sterilizing apparatus 100 operates in a manner as described below.

The food contained in trays 90, 90 supplied by a supply means (not shown) is received by the receiving section 11 of the food feeding section 1 such that a pair of juxtaposed trays 90, 90 is arranged in the receiving section 11 at one time. Then, the first pusher device 13 is operated to move the juxtaposed trays 90, 90 to the downstream end of the preheating chamber 12 by means of the pusher rod 13a.

Since steam is supplied to the inside of the preheating chamber 12 by the steam supply means 15, the air that fills the gaps existing in the food e.g. gaps among the grains of rice, housed in the trays 90, 90 is replaced with steam to preheat the food while the food is advancing forward in the preheating chamber 12.

Figure 3:
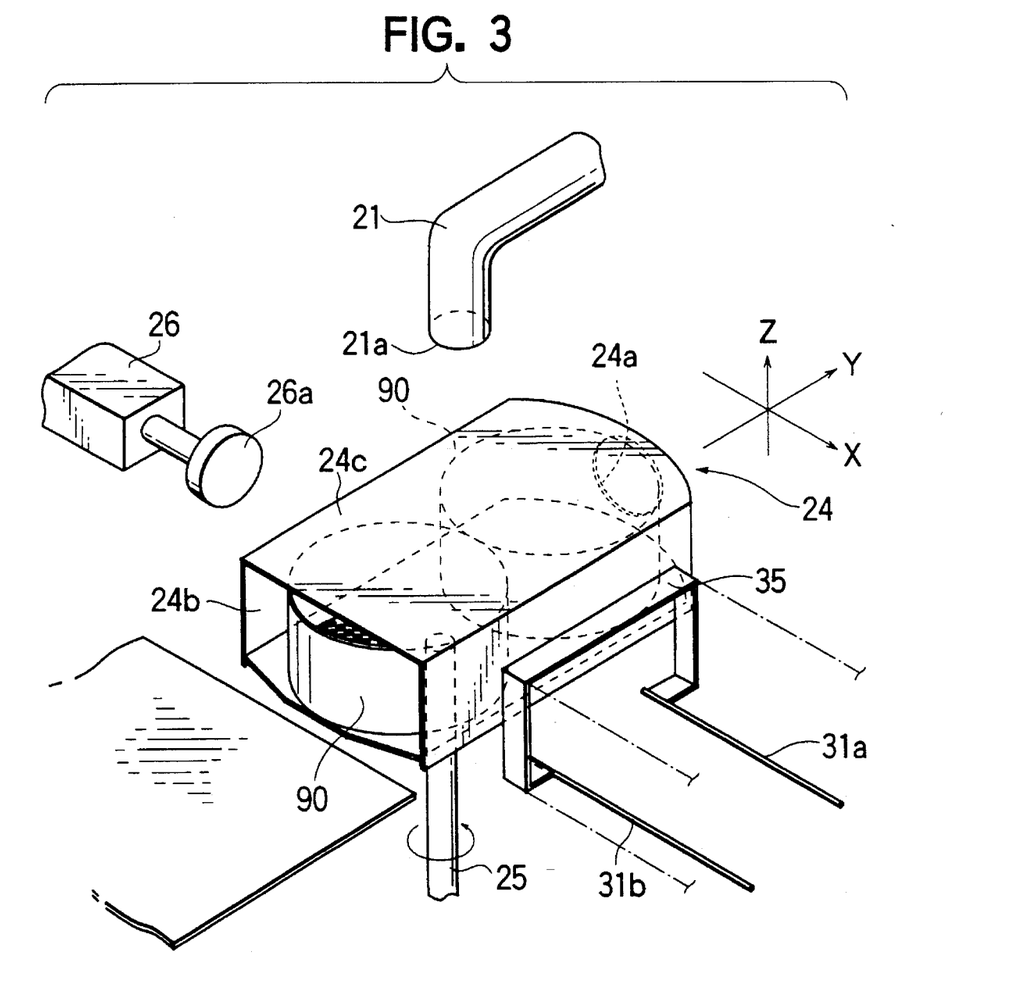
FIG. 3 is a schematic perspective view of the turn table arranged in the pressure upward regulating chamber of the first embodiment of the food sterilizing apparatus according to the invention, showing the turn table placed in a first position.

Then, the first gate valve 10 is opened to make the pressure upward regulating chamber 2 communicate with the preheating chamber 12, while the second gate valve 20 is kept closed, and the turn table 24 is moved to its first position as shown in FIGS. 1 and 3.

Then, the pusher rod 14a of the second pusher device 14 is extended to push the trays 90, 90 arranged in juxtaposition at the downstream end of the preheating chamber 12 into the turn table 24 in a row running along the pressure upward regulating chamber 2. While the rear tray 90 may ride on the front tray 90 under this condition, the top plate 24c of the turn table 24 prevents such a riding motion from taking place.

Thereafter, the pusher rod 14a is contracted and the turn table 24 is rotated counterclockwise by 90° to its second position as illustrated in FIG. 4. Simultaneously or subsequently, the first gate valve 10 is shut to bring the pressure upward regulating chamber 2 into a closed state and then the control valve 22 is opened to allow steam to flow into the pressure upward regulating chamber 2 from the tank 23 until the inner pressure of the pressure upward regulating chamber becomes equal to that of the heating and sterilizing chamber 3. Since the top plate 24c of the turn table 24 covers the openings 93, 93 of the trays 90, 90, steam bursting out of the open end 21a of the pipe 21 would not directly hit the food in the trays 90, 90 and blow it away.

Then, the second gate valve 20 is opened and the third pusher device 26 is operated to extend the pusher rod 26a, which by turn pushes the trays 90, 90 in the turn table 24 into the tray transfer route in the heating and sterilizing chamber 3. Since the heating and sterilizing chamber 3 is already filled with trays on the transfer route as a result of preceding cycles, the frontmost pair of trays on the transfer route is pushed into the turn table 33 by the newly arrived pair of trays 90, 90 that is pushed onto the transfer route. The open lateral side of the turn table 33 has been directed to the transfer route of the heating and sterilizing chamber 3 to receive the pair of trays 90, 90 pushed out of the heating and sterilizing chamber 3.

Thereafter, the turn table 33 is rotated clockwise by 90° and the third gate valve 30 is opened. As described above, since the inner pressure of the cooling chamber 4 is set (maintained) at a level higher than the inner pressure of the heating and sterilizing chamber 3 by 0.05–0.3 cm/Kg², more preferably, 0.1–0.2 cm/Kg², the pressure drop will not occur at the chamber 3 side of the third gate valve 30 even when the gate valve 30 is opened. Accordingly, the reboiling phenomenon will never occur.

Then, the fourth pusher device 34 is operated to extend the pusher rod 34a and push the trays 90, 90 in the turn table 33 toward the cooling chamber 4 until the trays are put into the turn table 41 having its open lateral side directed to the fourth pusher device 34.

Meanwhile, after the trays 90, 90 are pushed out of the turn table 24, the second gate valve 20 is closed and the inner pressure of the pressure upward regulating chamber 2 is reduced to the level of the atmospheric pressure by a pressure reducing means (not shown) for example, a valve. Then, the first gate valve 10 is opened, and next pair of trays 90, 90 are introduced into the pressure upward regulating chamber 2.

Then, the third gate valve 30 is closed and the turn table 41 is rotated counterclockwise by 90° until the open lateral side of the turn table 41 is directed to the transfer route of the cooling chamber 4. Subsequently, the fifth pusher device 41 is operated to extend the pusher rod 42a and push the pair of trays 90, 90 on the turn table 41 onto the transfer route in the cooling chamber 4. Since the cooling chamber 4 is already filled with trays on the transfer route as a result of preceding cycles, the frontmost pair of trays on the transfer route is pushed into the turn table 44 having its open lateral side directed to the transfer route by the newly arrived pair of trays 90, 90 that is pushed onto the transfer route by the fifth pusher device 42 as in the case of the heating and sterilizing chamber 3.

Now, the turn table 44 is rotated clockwise by 90°. Then, the fifth gate valve 50 is closed and, while keeping the open lateral side of the turn table 51 directed to the cooling chamber 4 (as shown in FIG. 1), air is suppled to the pressure downward regulating chamber 5 from the air supply pipe until the inner pressure of the pressure downward regulating chamber 5 gets to the level of that of the cooling chamber 4. Then, the fourth gate valve 40 is opened to make the pressure downward regulating chamber 5 communicate with the cooling chamber 4 and the sixth pusher device 45 is operated to extend the pusher rod 45a and push the trays 90, 90 housed in the turn table 44 in a row into the turn table 51.

Thereafter, the pusher rod 45a of the sixth pusher device 45 is contracted to its original position and the turn table 51 is rotated counterclockwise by 90° so that its open lateral side of the turn table is directed to the delivery section 6. Simultaneously or subsequently, the fourth gate valve 40 is shut to bring the pressure downward regulating chamber 5 into a closed state and then the pressure reducing means (not shown) such as a valve is opened to allow the inner pressure of the pressure downward regulating chamber 5 to fall to the level of the atmospheric pressure.

Then, the fifth gate valve 50 is opened and the seventh pusher device 52 is operated to extend the pusher rod 52a and push the trays 90, 90 housed in the turn table 51 in a row into the delivery section 6.

The trays 90, 90 moved into the delivery section 6 are then transferred to a subsequent station (not shown) for packaging by means of the belt conveyor 70.

A result of the sterilization experiment using the apparatus 100 will be shown below. In the experiment, trays containing 200 g of boiled rice are handled at a rate of 10 trays per minute.

EXAMPLE 1

Temperature and inner pressure of the heating and sterilizing chamber 3 are maintained at 130° C. and 1.75 $Kg/cm^2$, respectively. Temperature and inner pressure of the cooling chamber 4 are maintained at 80° C. and 1.80 $Kg/cm^2$, respectively.

EXAMPLE 2

Temperature and inner pressure of the heating and sterilizing chamber 3 are maintained at 130° C. and 1.75 $Kg/cm^2$, respectively. Temperature and inner pressure of the cooling chamber 4 are maintained at 80° C. and 1.90 $Kg/cm^2$, respectively.

EXAMPLE 3

Temperature and inner pressure of the heating and sterilizing chamber 3 are maintained at 130° C. and 1.75 $Kg/cm^2$, respectively. Temperature and inner pressure of the cooling chamber 4 are maintained at 80° C. and 2.05 $Kg/cm^2$, respectively.

COMPARISON

Temperature and inner pressure of the heating and sterilizing chamber 3 are maintained at 130° C. and 1.75 $Kg/cm^2$, respectively. Temperature and inner pressure of the cooling chamber 4 are maintained at 80° C. and 1.65 $Kg/cm^2$, respectively.

In the examples 1–3, no excess water was observed on the surface of the sterilized food (boiled rice) and the texture of the food was excellent. On the other hand, in comparison, excess water was observed on the surface of the sterilized food (boiled rice) and the texture thereof was not acceptable.

Now, a second embodiment of food sterilizing apparatus will be described by referring to FIG. 5. Since the food sterilizing apparatus 200 of this embodiment is substantially similar to the food sterilizing apparatus 100 of the first embodiment, only the difference between the two embodiments will be described hereinafter and the components similar to those of the first embodiment will be denoted by the same reference numerals that are prefixed by 2 or 20 and their descriptions will be omitted.

Figure 5:
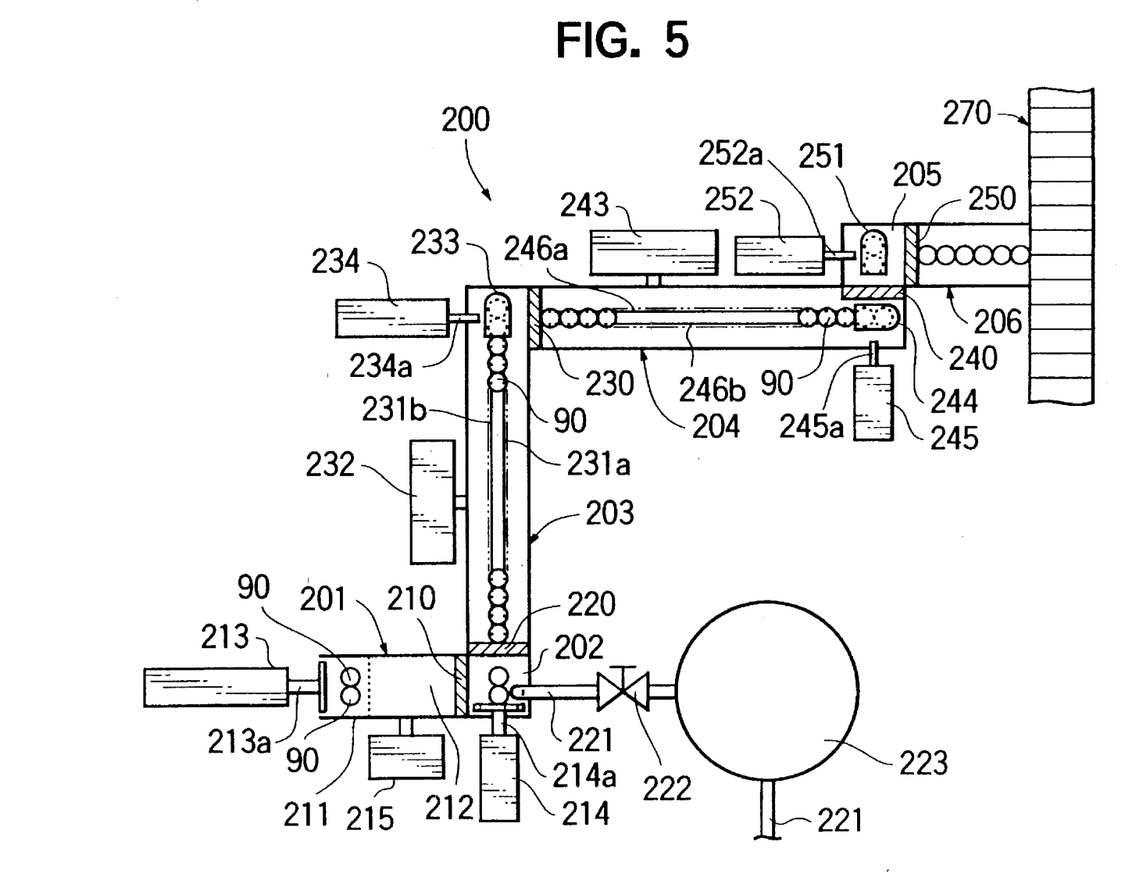
FIG. 5 is a schematic plan view of a second embodiment of the food sterilizing apparatus according to the invention, showing its overall configuration.

As seen from FIGS. 1 and 5, the food sterilizing apparatuses 100 and 200 are different in the way the food feeding sections 1 and 201, the heating and sterilizing chamber 3 and 203 and the cooling chambers 4 and 204 are connected. In the food sterilizing apparatus 100, the food feeding section 1, the heating and sterilizing chamber 3 and the cooling chamber 4 are arranged and connected in such a way that the directions along which the trays are advanced respectively in the food feeding section 1, the heating and sterilizing chamber 3 and the cooling chamber 4 are parallel to each other and, therefore, a pair of trays are transferred forward at the junctions by means of a pair of pusher devices (e.g., 14 and 26) and a turn table (e.g., 24) such that they appear like a "crank" there.

On the other hand, in the food sterilizing apparatus 200, the food feeding section 201 and the heating and sterilizing chamber 203 are arranged perpendicularly relative to each other, so that trays moving therethrough turn rectangularly at the junction thereof. Likewise, the heating and sterilizing chamber 203 and the cooling chamber 204 are arranged perpendicularly relative to each other so that trays moving therethrough turns rectangularly again at the junction thereof.

As a result, the pressure upward regulating chamber 202 does not require a turn table for the operation of the food sterilizing apparatus 200 while the junctions require only single pusher devices (214, 234, respectively) in order to transfer trays forward.

It should be noted that the above embodiments are described in order to illustrate the present invention and do not by any means limit the scope of the invention. A variety of modifications may be made thereto without departing from the spirit and scope of the invention.

What is claimed is:

1. A food sterilizing apparatus comprising a heating and sterilizing chamber for heating and sterilizing the food, a cooling chamber connected to said heating and sterilizing chamber via a sealing gate, means for maintaining the inner pressure of said cooling chamber at a level higher than the inner pressure of said heating and sterilizing chamber by 0.05–0.3 $Kg/cm^2$, and means for successively advancing the food received in containers having open portions from said heating and sterilizing chamber to said cooling chamber.

2. A food sterilizing method comprising the steps of:

feeding food into a sterilizing apparatus, said sterilizing apparatus including a heating and sterilizing chamber for heating and sterilizing food and a cooling chamber connected to the heating and sterilizing chamber via a sealing gate, the heating and sterilizing chamber and the cooling chamber each having an inner pressure;

maintaining the inner pressure of the cooling chamber at a level higher than the inner pressure of the heating and sterilizing chamber by 0.05–0.3 $Kg/cm^2$; and passing food through the sterilizing apparatus to sterilize and cool the food.

3. A food sterilizing method according to claim 2, wherein the inner pressure of the cooling chamber is maintained at a level higher than the inner pressure of the heating and sterilizing chamber by 0.1–0.2 $Kg/cm^2$.

4. A food sterilizing method according to claim 2, wherein the inner pressure of the cooling chamber is maintained at a level higher than the inner pressure of the heating and sterilizing chamber by 0.05–0.3 Kg/cm².

5. A food sterilizing apparatus comprising:

a food feeding section;

a pressure upward regulating chamber;

a heating and sterilizing chamber for heating and sterilizing food under pressure higher than atmospheric pressure;

a cooling chamber for cooling the heated and sterilized food;

a pressure downward regulating chamber and a delivery section for discharging the food arranged successively and connected by way of respective sealing gates;

the food being contained in rigid containers, each container having an opening and being moved successively from said food feeding section to said heating and sterilizing chamber;

said food feeding section, said heating and sterilizing chamber, said cooling chamber and said delivery section being arranged perpendicularly relative to or in parallel with each other and said food feeding section;

said pressure upward regulating chamber, said heating and sterilizing chamber, said cooling chamber, said pressure downward regulating chamber and said delivery section being provided at respective upstream portions thereof with a pusher device for pushing downstream said rigid containers; and means for maintaining the inner pressure of said cooling chamber at a level higher than the inner pressure of said heating and sterilizing chamber by 0.05–0.3 Kg/cm².

6. A food sterilizing apparatus comprising a heating and sterilizing chamber for heating and sterilizing the food, a cooling chamber connected to said heating and sterilizing chamber via a sealing gate, means for maintaining the inner pressure of said cooling chamber at a level higher than the inner pressure of said heating and sterilizing chamber by 0.1–0.2 Kg/cm², and means for successively advancing the food received in containers having open portions from said heating and sterilizing chamber to said cooling chamber.

* * * * *